Oct. 10, 1939.     R. E. RUTLEDGE     2,175,670
EGG CARTON AND FILLER
Filed July 8, 1937     2 Sheets-Sheet 1
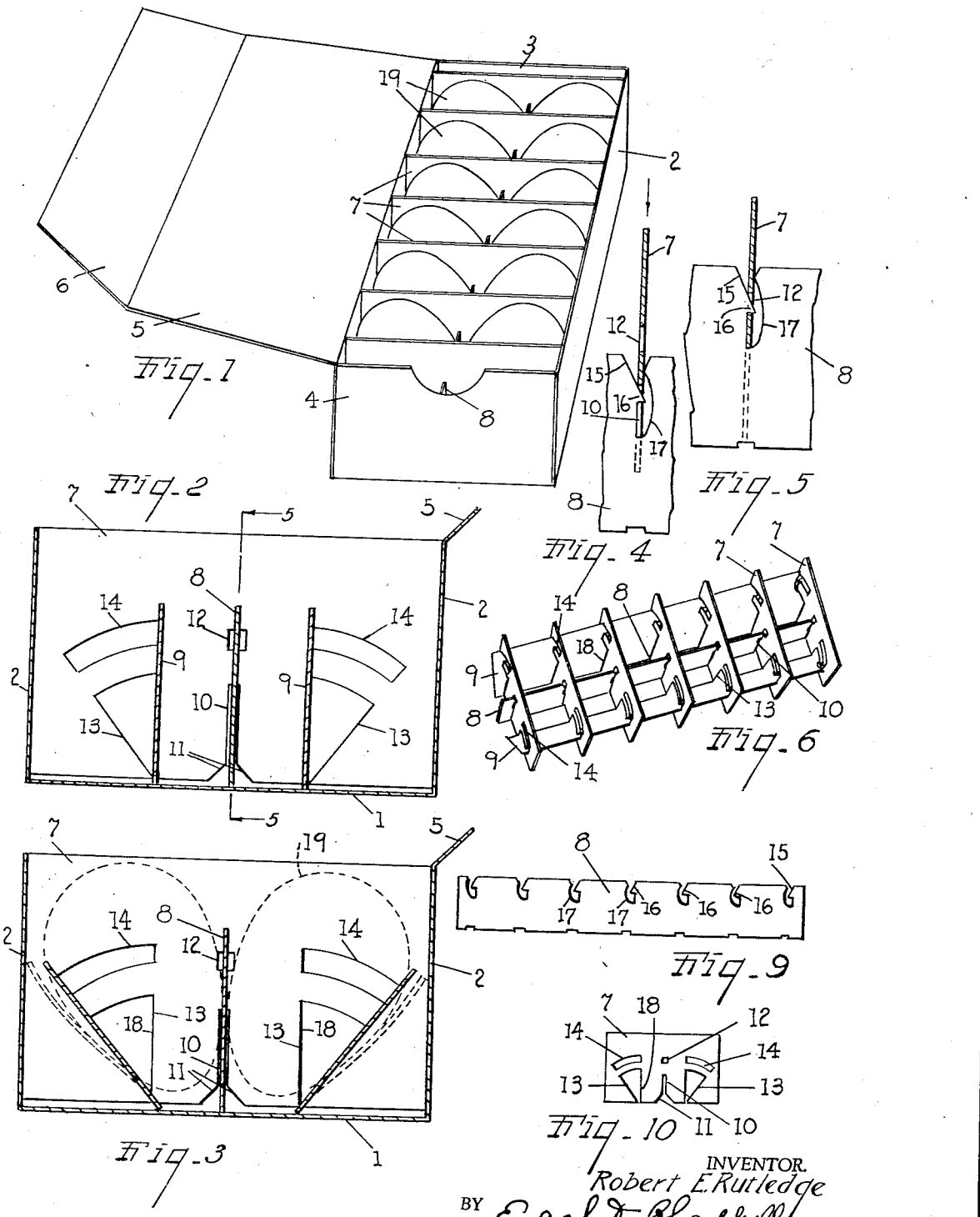
INVENTOR.
Robert E. Rutledge
BY Earl T. Chappell
ATTORNEYS.

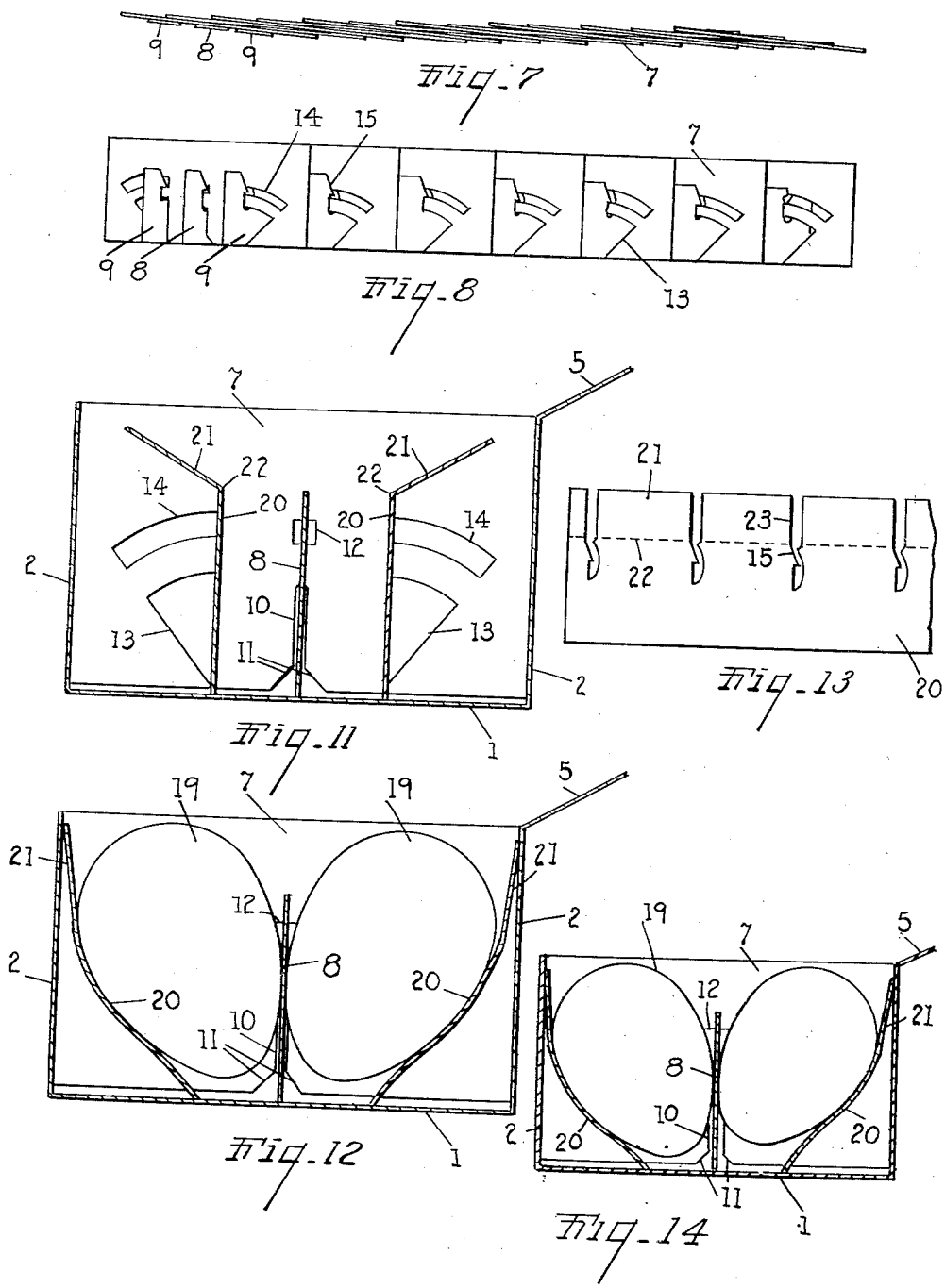

Patented Oct. 10, 1939

2,175,670

UNITED STATES PATENT OFFICE 2,175,670

EGG CARTON AND FILLER

Robert E. Rutledge, Kalamazoo, Mich., assignor to Sutherland Paper Company, a corporation of Michigan Application July 8, 1937, Serial No. 152,516

3 Claims. (Cl. 217—32)

This invention relates to improvements in egg cartons and fillers.

The main objects of this invention are:

First, to provide an improved egg carton which effectively supports the eggs in cushioning relation.

Second, to provide an improved egg carton in which eggs of varying sizes are supported so that they present a uniform appearance.

Third, to provide an egg carton which permits rapid filling while minimizing egg breakage.

Fourth, to provide an egg filler structure having these advantages which is simple and economical and easily assembled.

Objects relating to details and economies of the invention will appear from the description to follow. The invention is defined and pointed out in the claims.

Preferred embodiments of the invention are illustrated in the accompanying drawings, in which:

Fig. 1 is a perspective view of an egg carton embodying the features of my invention, eggs being conventionally shown therein.

Fig. 2 is a transverse section, the cover being partially broken away.

Fig. 3 is a transverse section with the cover partially broken away, the eggs being indicated by dotted lines and the side longitudinal members being shown in fully extended position by dotted lines.

Fig. 4 is a fragmentary section illustrating one of the steps in assembling the central longitudinal filler member with the transverse filler members.

Fig. 5 is a fragmentary view partially in section on line 5—5 of Fig. 2.

Fig. 6 is a perspective view of the filler unit removed from the box or carton and in fully erected position with the side longitudinal members outwardly inclined.

Fig. 7 is a top view with the filler unit collapsed.

Fig. 8 is a side view of the filler unit when collapsed.

Fig. 9 is a side elevation of one of the longitudinal filler members.

Fig. 10 is an elevation of one of the transverse filler members.

Fig. 11 is a cross section of a slightly modified form or embodiment of my invention, the cover being partially broken away.

Fig. 12 is a cross section corresponding to that of Fig. 3 of the modified embodiment shown in Fig. 11 with the side longitudinal members in extended position and eggs conventionally shown.

Fig. 13 is a fragmentary side elevation of one of the side longitudinal members of the embodiment shown in Fig. 11.

Fig. 14 is a fragmentary view similar to that of Fig. 12 illustrating the adaptability and desirability of the device in supporting eggs of varying sizes.

In the accompanying drawings, the box or carton is conventionally illustrated and comprises bottom 1, side walls 2, 2, end walls 3 and 4, and a cover 5 provided with a closing flap 6.

My improved filler unit consists of a plurality of transverse partitions or filler members 7, a central longitudinal member 8, and side longitudinal members 9, 9.

The transverse members 7 are provided with central slots 10 opening at their bottom edges, the slots being preferably provided with enlarged entrance portions 11 to facilitate assembly. These transverse partitions also have holes 12 spaced from the upper ends of the slots 10 and in alignment therewith. At each side of the central slot, the transverse members are provided with triangular-shaped slots 13 opening at the lower edges of the member 7. In spaced relation to the upper ends of the slots 7 are segmental slots 14.

The longtudinal members 8 and 9 of the embodiment shown in Figs. 1 to 10 inclusive are duplicates and they are provided with slots 15 in their upper edges spaced according to the spacing of the transverse partition members, these members being adapted to be engaged in the downwardly opening slots in the transverse partition members. These slots 15 of the longitudinal members are adapted to receive the downwardly opening slots 10 and 13 and are provided with lugs 16, the lugs of the central member being engageable with the holes 12 while the lugs of the side members are engageable with the segmental slots 14. The side 17 of the slots 15 opposite the lugs are preferably curved as shown so that the lugs form members overhanging the bottom portions of the slots and project through the holes 12 and the slots 14 provided therefor.

When a unit made up of the transverse and longitudinal members is assembled and the longitudinal members are brought into parallel relation as shown in Fig. 2, the unit may be collapsed as shown in Figs. 7 and 8 and to permit the parts being brought into this parallel relation, the inner edges 18 of the slots 13 are parallel to the central slot 10.

With the parts as shown in Fig. 2, the small ends of the eggs indicated conventionally at 19 may be entered between the side and central longitudinal members and pushed downwardly and this forces the side members to the outwardly inclined position as shown in Figs. 3, 6 and 12. In this position, the eggs are supported in elevated relation to the bottom and the side longitudinal members form effective cushioning elements. If these side elements are forced out far enough as indicated by dotted lines in Fig. 3, their edges come into engagement with the side walls of the box and their movement is limited thereby. However, whatever the position, they form effective cushioning members for the eggs.

In the embodiment shown in Fig. 11, the side members 20 corresponding to the side members 9 are provided with extensions 21 along their upper edges and preferably lightly scored at 22 to facilitate bending. The slots 15 are extended at 23 through these extensions. In this embodiment, when the eggs are placed into the compartments of the filler, the extension flaps 21 engage the side walls of the box and provide a somewhat further cushioning action or support for the eggs.

In Fig. 14, I illustrate the adaptability of a carton to eggs of substantially varying sizes. The eggs may be placed in the various cells and all of them pressed down by the cover or other suitable means and they will be supported with their tops in substantially the same level. This results in a very attractive package notwithstanding substantial variations in the sizes of the packaged eggs.

The eggs are supported in a cushioned relation and out of contact with the side walls and bottom of the box so that breakage is minimized even when the carton is subjected to severe usage.

The structure is economical both in the matter of material and the assembly of the filler unit.

I have illustrated and described my improvements in embodiments that I have found very practical. I have not attempted to illustrate or describe certain modifications and adaptations which I contemplate as it is believed that this disclosure will enable those skilled in the art to embody my invention or improvements as may be desired.

Having thus described my invention, what I claim as new and desire to secure by Letters Patent, is:

1. A filler for an egg or like carton comprising transverse members having central slots extending from the bottom edges thereof and holes spaced from the upper ends of the slots and aligned therewith, said transverse member also having upwardly expanding triangular side slots extending from the bottom edges thereof and segmental slots spaced from the upper ends of said side slots, a central longitudinal member disposed in said central slots of said transverse members and having slots in its upper edge provided with lugs engaging the holes in said transverse members, and side longitudinal members disposed in said side slots in said transverse members for tilting movement therein, said side longitudinal members having slots in their upper edges provided with lugs engaging in said segmental slots, said central and side longitudinal members being identical in shape.

2. A filler for an egg or like carton, comprising transverse members apertured centrally to receive a central longitudinal partition member, a central longitudinal member having portions engageable with the central apertures in said transverse members, said transverse members having upwardly expanding triangular side slots extending from the bottom edges thereof and also having segmental slots spaced substantially from the upper end of said triangular slots, and side longitudinal members having slots in their upper edges for engagement of the longitudinal and transverse members and being provided with lugs engaging in said segmental slots whereby said side longitudinal members are tiltable outwardly to brace said filler and into position parallel to the central member to permit collapsing of the filler, said side members having scored extensions on their upper edges adapted to engage the side walls of a carton in which the filler is placed when the side members are in outwardly tilted position.

3. A filler for an egg or like carton, comprising transverse members apertured centrally to receive a central longitudinal partition member, a central longitudinal member having portions engageable with the central apertures in said transverse members, said transverse members having upwardly expanding triangular side slots extending from the bottom edges thereof and also having segmental slots spaced substantially from the upper end of said triangular slots, and side longitudinal members having slots in their upper edges for engagement of the longitudinal and transverse members and being provided with lugs engaging in said segmental slots whereby said side longitudinal members are tiltable outwardly to brace said filler and into position parallel to the central member to permit collapsing of the filler.

ROBERT E. RUTLEDGE.